United States Patent
Kabir et al.

(10) Patent No.: US 9,145,914 B2
(45) Date of Patent: *Sep. 29, 2015

(54) MODULAR CRANKSHAFT

(75) Inventors: Omar M. Kabir, Waller, TX (US); Kent Pearl, Katy, TX (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 1981 days.

This patent is subject to a terminal disclaimer.

(21) Appl. No.: 11/358,450

(22) Filed: Feb. 21, 2006

(65) Prior Publication Data

US 2007/0193406 A1    Aug. 23, 2007

(51) Int. Cl.
*F16D 3/00* (2006.01)
*F16C 3/10* (2006.01)

(52) U.S. Cl.
CPC .............. *F16C 3/10* (2013.01); *Y10T 29/49826* (2015.01); *Y10T 74/2173* (2015.01); *Y10T 74/2177* (2015.01); *Y10T 403/13* (2015.01); *Y10T 403/25* (2015.01); *Y10T 403/251* (2015.01); *Y10T 403/253* (2015.01); *Y10T 403/255* (2015.01); *Y10T 403/55* (2015.01); *Y10T 403/557* (2015.01); *Y10T 403/64* (2015.01); *Y10T 403/645* (2015.01)

(58) Field of Classification Search
USPC ............. 403/15, 29, 31, 34, 36, 37, 150, 273, 403/274, 276, 279, 280, 282, 292, 297, 335, 403/337, 35, 38, 39, 288; 464/7, 182; 123/192.1–192.5; 74/594, 595, 598; 277/584, 641, 910; 29/451, 522.1, 29/888.08; 285/124.5
See application file for complete search history.

(56) References Cited

U.S. PATENT DOCUMENTS

| | | | |
|---|---|---|---|
| 1,504,238 A | | 8/1924 | Hildebrand |
| 2,125,552 A | | 8/1938 | Feldhoff |
| 2,331,541 A | | 10/1943 | Dusevoir |
| 2,364,109 A | | 12/1944 | Taylor |
| 2,380,099 A | * | 7/1945 | Dusevoir ........................ 74/598 |
| 2,747,428 A | | 5/1956 | Peter et al. |
| 3,143,969 A | * | 8/1964 | Sanford et al. ............... 417/44.9 |
| 3,212,831 A | * | 10/1965 | Crankshaw et al. .......... 384/247 |
| 3,359,449 A | * | 12/1967 | Trask ............................. 313/357 |
| 3,368,271 A | * | 2/1968 | Scheffler ........................ 29/411 |
| 3,406,443 A | * | 10/1968 | De Ridder .................... 228/156 |
| 3,492,054 A | * | 1/1970 | Boggs et al. .................. 305/103 |
| 3,494,642 A | * | 2/1970 | Coberly et al. ............... 285/329 |
| 3,728,065 A | * | 4/1973 | Figwer .......................... 425/392 |
| 3,729,219 A | * | 4/1973 | Crane ............................ 403/287 |
| 4,530,145 A | * | 7/1985 | Bergheim et al. .............. 29/458 |

(Continued)

*Primary Examiner* — Daniel P Stodola
*Assistant Examiner* — Nahid Amiri
(74) *Attorney, Agent, or Firm* — Fletcher Yoder P.C.

(57) ABSTRACT

In accordance with certain embodiments, a modular crankshaft features a connection system between modules that features opposed female receptacles. A pin having opposed beveled ends and hydraulic passages with it is inserted into the opposed receptacles. A pair of seals is disposed on the beveled ends and straddles a hydraulic fluid outlet. The crankshaft wall that defines each receptacle is designed to flex in response to applied hydraulic pressure between the seals on the tapered pin portion. A notch at the base of the receptacle in the crankshaft reduces stress concentration and enables the wall defining the crankshaft receptacle to come back when hydraulic pressure through the pin is removed. The opposed crankshaft receptacles are flanged to allow them to be pulled together over the pin. An interference fit results around the pin after the flanges are mated and the hydraulic pressure is removed.

23 Claims, 4 Drawing Sheets

(56) References Cited

U.S. PATENT DOCUMENTS

| | | | |
|---|---|---|---|
| 4,622,864 A | 11/1986 | Fetouh | |
| 4,657,306 A | 4/1987 | Koopmans et al. | |
| 4,750,761 A * | 6/1988 | Watts | 285/14 |
| 5,038,450 A * | 8/1991 | Swars | 29/421.1 |
| 5,197,188 A * | 3/1993 | Maus et al. | 29/888.08 |
| 5,207,120 A | 5/1993 | Arnold et al. | |
| 5,218,883 A * | 6/1993 | Swars | 74/567 |
| 5,537,971 A | 7/1996 | Pong | |
| 6,869,244 B2 * | 3/2005 | Anderton et al. | 403/150 |
| 2009/0235779 A1 | 9/2009 | Kabir et al. | |
| 2011/0027008 A1 | 2/2011 | Kabir et al. | |

* cited by examiner

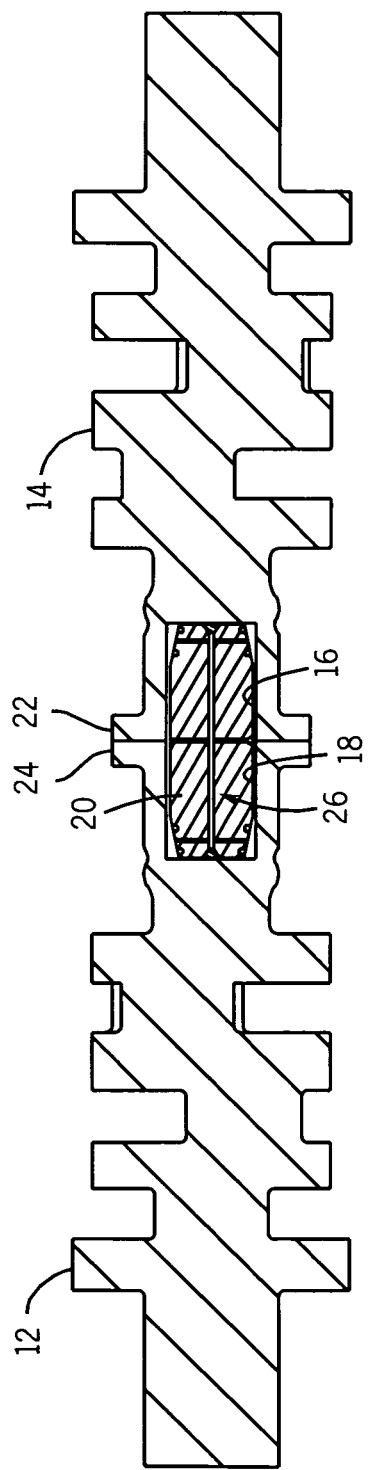

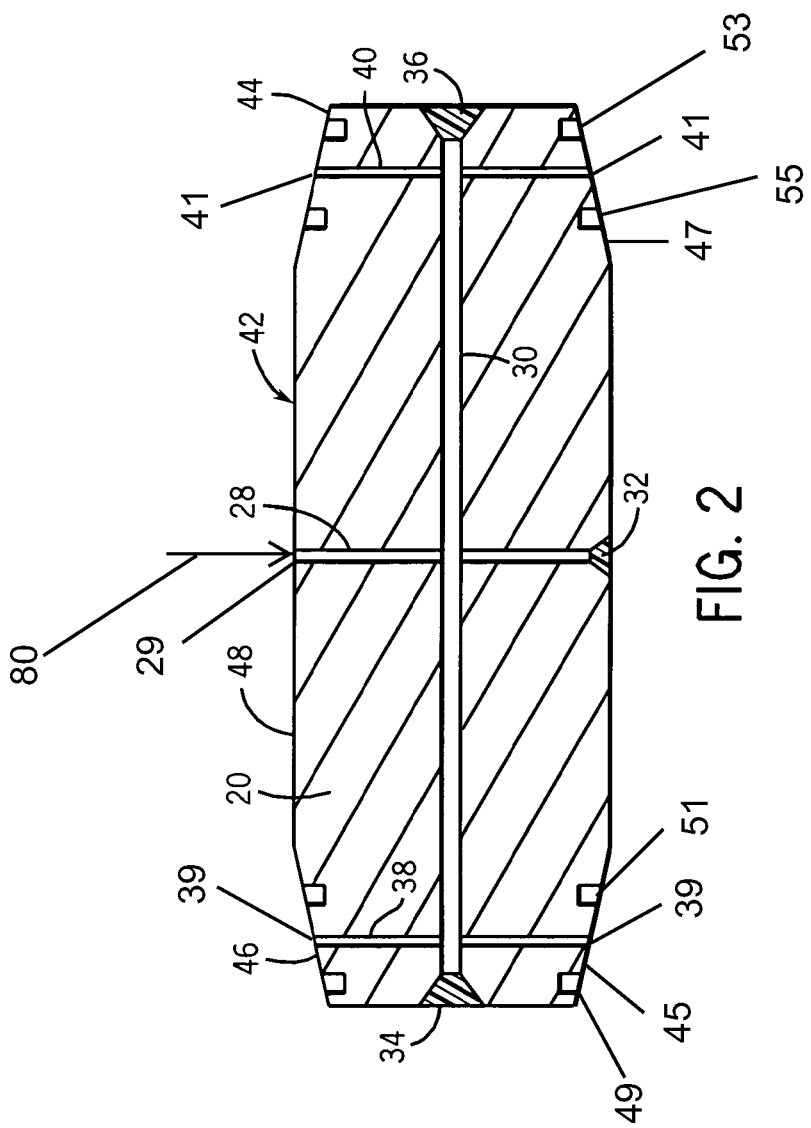
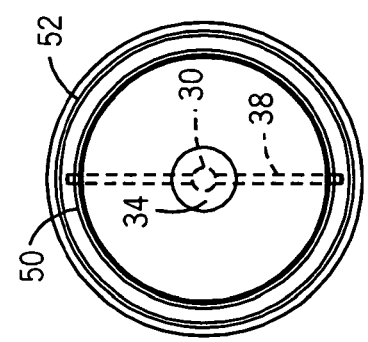

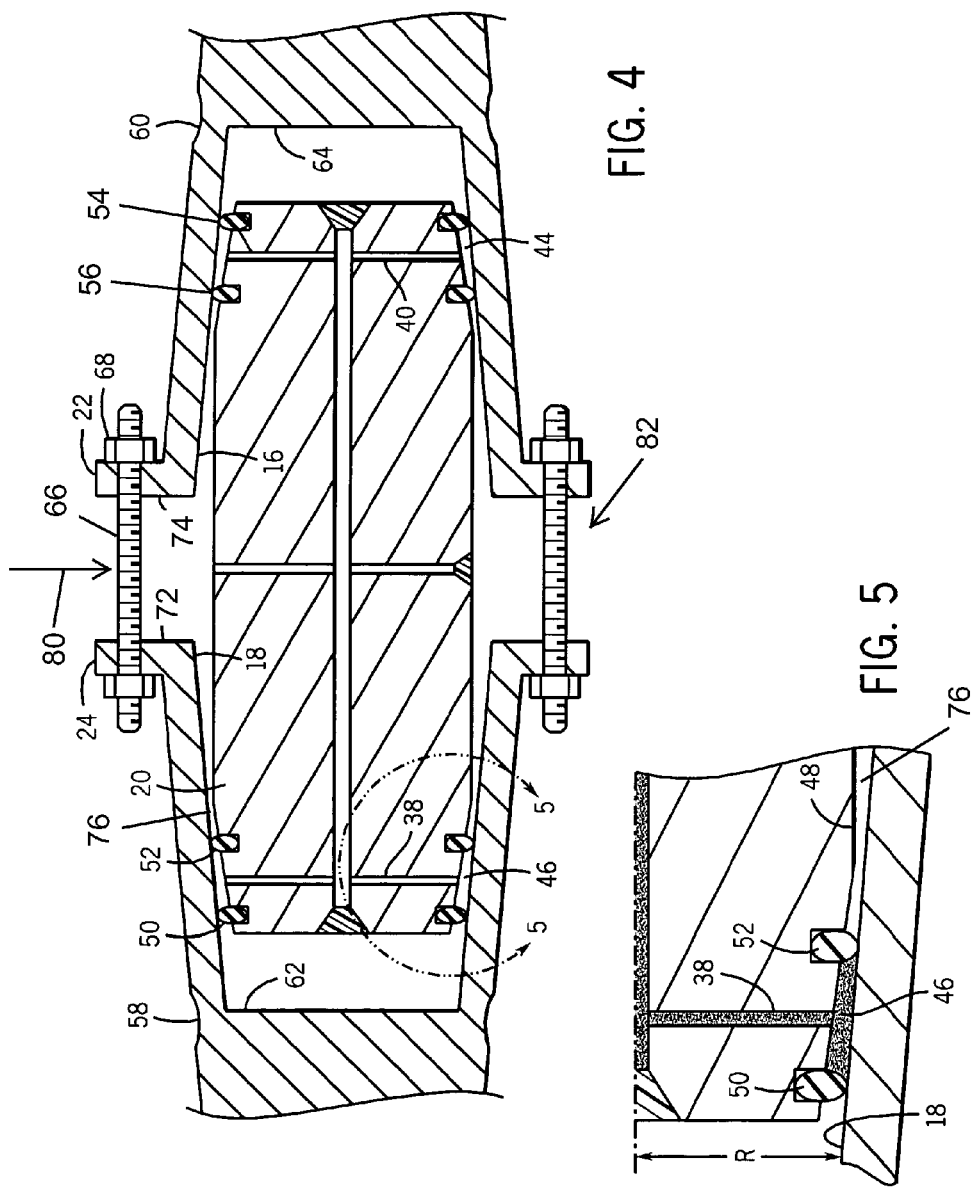

MODULAR CRANKSHAFT

BACKGROUND

The field of this invention is a crankshaft that is in modular form and more specifically relates to a connection technique that approaches the rigidity of a continuous crankshaft while allowing the flexibility to be in modular form.

Crankshafts are generally cast components that accommodate the required number of throws depending on the number of cylinders in the engine or compressor. In large compressor applications, a breakdown can be very expensive for the operator in the form of lost production or other process outage until repairs can be made, for instance. When the repair involves a crankshaft, the downtime can be lengthy because vendors seldom maintain an inventory of replacement crankshafts. Instead, when a replacement crankshaft is desired, it is manufactured from scratch, which can lead to delays and undesired downtimes.

One way to address the variety in the number of throws is to create a modular design where basic components can be assembled to each other to create the requisite configuration for a particular installation. The issue that doing this raises is how to fashion a connection that will be sufficiently rigid to address issues such as alignment, relative rotation and vibration, among other issues. Prior designs have attempted to connect modules with a splined male into female connection, as is described in U.S. Pat. No. 5,537,971. The problem with this design is the bulkiness of the connection and the clearances in the splined connection that permit assembly but over time can wear to the point of permitting relative rotational movement that can cause vibration and even spline failure, for example. Another solution is depicted in U.S. Pat. No. 4,622,864. This technique freezes a pin and inserts this frozen pin into aligned bores to put the modules together. This process requires precise alignment of the pin to make sure that lubrication passages through it are not obstructed. In other respects, modular shafts that attach the modules together with threads are known, as shown in a rock breaking tool in U.S. Pat. No. 4,657,306.

Therefore, there exists a need for improved modular crankshaft connection techniques.

SUMMARY OF THE INVENTION

In accordance with certain embodiments, the present invention provides a plug with opposed tapers and spaced seal rings. Hydraulic fluid channels run to the tapered exterior between the seals and spread the opposing receptacles in the adjoining modules to allow insertion of a cylindrical portion of the pin into the respective receptacles. The receptacles are configured to flex in response to hydraulic pressure and to return to the original dimension when such pressure is removed, thus creating an interference fit. The modules are then flanged together with proper torque on the flange bolts. Those skilled in the art will appreciate the various aspects of the present invention from a review of the exemplary embodiments and the drawings that appear below, as well as from the claims.

By way of example, certain embodiments of the present invention provide a modular crankshaft that features a connection system between modules that features opposed female receptacles. A pin having opposed beveled ends and hydraulic passages therein is inserted into the opposed receptacles. A pair of seals is disposed on the beveled ends and straddles a hydraulic fluid outlet. The crankshaft wall that defines each receptacle is designed to flex in response to applied hydraulic pressure between the seals on the tapered pin portion. A notch at the base of the receptacle in the crankshaft reduces stress concentration and enables the wall defining the crankshaft receptacle to come back when hydraulic pressure through the pin is removed. The opposed crankshaft receptacles are flanged to allow them to be pulled together over the pin. An interference fit results around the pin after the flanges are mated and the hydraulic pressure is removed.

DETAILED DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a section view of two modules joined by the attachment of the present invention, in accordance with an embodiment thereof;

FIG. 2 is a detailed view of the exemplary pin that is used in connecting the modules;

FIG. 3 is an end view of the pin of FIG. 2;

FIG. 4 is a view of the pin part way into opposing receptacles on the crankshaft modules;

FIG. 5 is a detailed view of a pin end of the pin as it is advanced into the receptacle.

DETAILED DESCRIPTION

Figure 6:
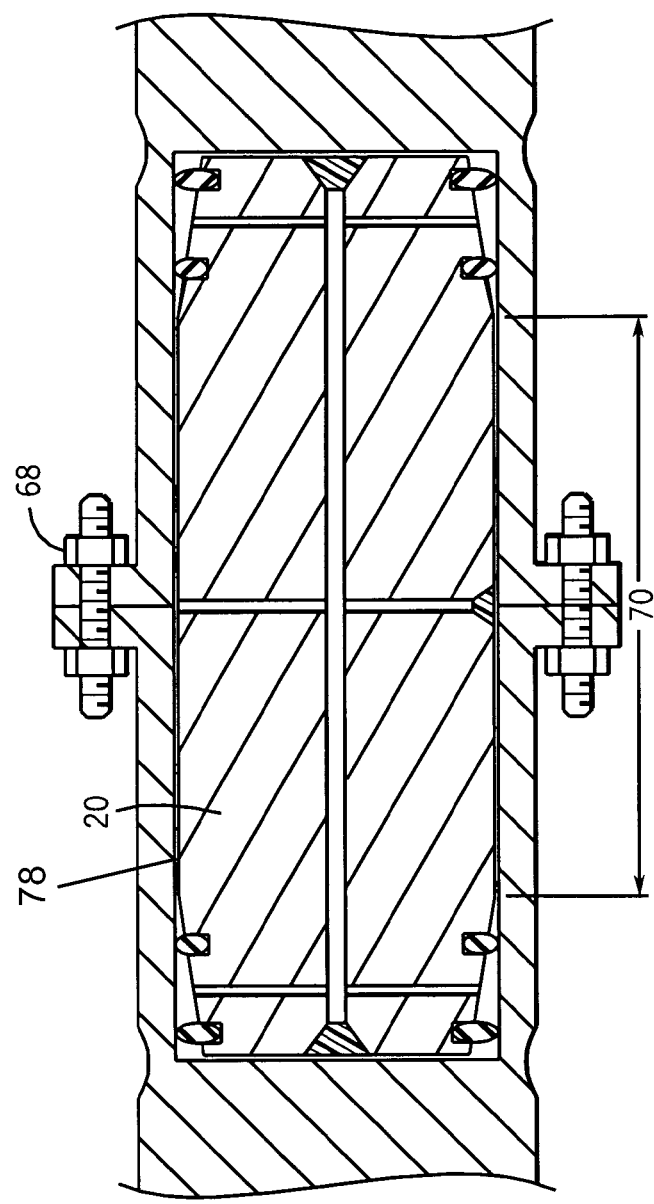
FIG. 6 is shows the pin fully advanced as the modules are connected to each other.

The exemplary modular crankshaft 10 has at least two illustrated modules 12 and 14. The connection between them comprises facing end receptacles 16 and 18 that receive opposed ends of a pin 20. The exemplary modules have flanges 22 and 24 that can be drawn together over pin 20 to complete the connection. The pin 20 has a system of oil passages 26 through it. Details regarding the pin 20 can be better understood by reference to FIG. 2.

FIG. 2 shows the pin 20 having an inlet passage 28 connected to a transverse passage 30. Inlet passage 28 is open at an inlet 29 and is sealed at 32, and transverse passage 30 is sealed at opposed ends 34 and 36. There are two oil outlet passages 38 and 40 that, as illustrated, are parallel to each other. However, it is worth noting that these passages may intersect and may be disposed in the same plane or in intersecting planes. Passages 38 and 40 can have one or more outlets 39 and 41, respectively, on the outer surface 42 of the pin 20. Ends 44 and 46, as illustrated, present a reduced dimension when compared to the main portion 48 of the pin 20 that is located between them. That is, ends 44 and 46 present a frusto-conical section forming a truncated segment of a cone 45 and 47 respectively, but other shapes are contemplated. This reduced diameter profile at ends 44 and 46 facilitates interference free insertion into receptacles 16 and 18, although some interference on seals 50 and 52 (e.g., recessed in grooves 49 and 51) at one end and seals 54 and 56 (e.g., recessed in grooves 53 and 55) at the other end is contemplated and, in fact, desired for sealing pressure. FIG. 3 shows seals 50 and 52 on the reduced dimension portion 46. In the exemplary embodiment, the opposed end view is the same, but the invention contemplates different end treatments in accomplishing the reduced dimension. With regard to the main portion 48, the receptacles 16 and 18 can be similarly shaped. However, the main point is that the shapes of the main portion 48 and the receptacles 16 and 18 be compatible so that they ultimately produce an interference fit around main portion 48. Accordingly, other compatible cross-sectional shapes besides round are contemplated.

FIGS. 4 and 5 illustrate the assembly technique in more detail. FIG. 4 also illustrates exemplary circumferential recesses 58 and 60 that have a U-shaped cross-section. These recesses 58 and 60 serve to reduce stress concentrations at bottoms 62 and 64 of receptacles 18 and 16 when their dimension is enlarged so that the receptacles will elastically return to their original dimensions around pin 20 when oil pressure is removed, instead of plastically deforming under applied oil pressure. As shown in FIG. 4, ends 44 and 46 have reduced dimension to allow them to readily enter the receptacles 16 and 18. At some point of insertion, seals 50 and 52, for example, make contact with receptacle 18, while the same result occurs at the other end of pin 20 as nut 68 is rotated on threaded rod 66 bringing flanges 22 and 24 closer together. Bolts and nuts can be used as an alternative. FIG. 5 shows seals 50 and 52 contacting receptacle 18 as oil is applied under pressure through passage 38. The oil under pressure elastically enlarges the dimension of the receptacle 18 as well as the receptacle 16 through passage 40. As a result, the main portion 48 does not drag or only minimally contacts the surrounding receptacle as the flanges 22 and 24 are brought together with the oil pressure applied to passages 38 and 40 between seal pairs at opposed ends of the pin 20, as indicated by clearance 76.

FIG. 6 illustrates the fully mated position of flanges 22 and 24. It should be noted that oil pressure is applied until the flanges mate to keep the receptacles 16 and 18 elastically enlarged to avoid hanging the pin 20 in either receptacle, as indicated by clearance 76 in FIGS. 4 and 5. As soon as the nut 68 is torqued to specification, the oil pressure is relieved and the presence of recesses 58 and 60 facilitate the elastic return to the original dimension for receptacles 16 and 18. The end result is that an interference fit (e.g., no clearance 78) is created in the zone 70 that generally corresponds to main portion 48. The modules 12 and 14 are now fully assembled. The oil line 80, as shown in FIGS. 2 and 4, is disconnected and capped. Those skilled in the art will appreciate that the oil inlet connection (e.g., line 80) is placed adjacent a gap 82 in the flanges 22 and 24 to allow oil access while the flanges 22 and 24 are pulled together. Additionally, the connection described above can be undone by reversing the process and applying oil pressure while parting the flanges 22 and 24.

Those skilled in the art will appreciate that the present invention provides a unique way of joining modular crankshaft components for engines or compressors or other power equipment. The technique employs a residual interference fit to better provide continuing alignment and to guard against relative rotation, without the need for splines, for instance. The use of the oil pressure to elastically deform the receptacles allows assembly without specialized tools and shortens the time required for assembly. The recesses at the base of the receptacles 16 and 18 mitigate against the occurrence of undesirable plastic deformation and thus provide an interference fit of the pin 20 in receptacles 16 and 18. Two or more modular sections that are alike or unlike can be joined in this manner to accommodate the required number of throws or spacing desired. Pin 20 can be machined or forged. Precision instruments are not required for assembly. The exemplary mating faces 72 and 74 are precision machined so that when they are brought together the modules 12 and 14 are properly aligned. The presence of the pin 20 in receptacles 16 and 18 provides the needed rigidity to the connection under load and reduces the likelihood of deforming or deflecting or flexing under torque to allow the modular components to function as well as a unitary design. Modular components can now be kept on hand to handle a variety of applications with different number of throws so as to reduce inventory costs and to speed up repairs regardless of the crankshaft configuration using the technique of modularity described above.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claims, including the full range of equivalency to which each element thereof is entitled.

Again, the above description is illustrative of exemplary embodiments, and many modifications may be made by those skilled in the art without departing from the invention whose scope is to be determined from the literal and equivalent scope of the claims below.

The invention claimed is:

1. A system, comprising:
    a male connector, comprising:
        a body having an annular exterior surface, a central axis, a first axial end portion, and a second axial end portion;
        an inlet port into the body between the first axial end portion and the second axial end portion;
        a first outlet port out of the body between the first axial end portion and the second axial end portion;
        a passage extending through the body to the inlet port and the first outlet port, wherein the passage is closed at the first and second axial end portions;
        a first pair of annular grooves extending around the central axis into the annular exterior surface, wherein the first pair of annular grooves comprises first and second annular grooves disposed on opposite axial sides of the first outlet port coupled to the passage; and
        a first pair of annular seals comprising a first annular seal disposed in the first annular groove and a second annular seal disposed in the second annular groove, wherein the first pair of annular seals is configured to retain a first fluid pressure from the first outlet port between the male connector and a first female connector, and the first fluid pressure is configured to cause elastic expansion of the first female connector during insertion or removal of the male connector relative to the first female connector.

2. The system of claim 1, wherein the annular exterior surface comprises a first conical surface converging toward the first axial end portion, and the first conical surface comprises the first outlet port.

3. The system of claim 1, wherein the passage comprises a lengthwise passage generally along the central axis, the passage comprises first and second passages crosswise to the central axis, the first passage extends to the first outlet port, and the second passage extends to the inlet port.

4. The system of claim 3, wherein the male connector comprises a second outlet port, the passage comprises a third passage crosswise to the central axis, the third passage extends to the second outlet port, and the inlet port is disposed axially between the first outlet port and the second outlet port, wherein the inlet port is configured to couple with an external fluid supply line.

5. The system of claim 1, wherein the male connector comprises a second outlet port between the first axial end portion and the second axial end portion, the male connector comprises a second pair of annular grooves extending around the central axis into the annular exterior surface, the second pair of annular grooves comprises third and fourth annular grooves disposed on opposite axial sides of the second outlet port, the passage extends through the body to the second outlet port, the inlet port is disposed axially between the first outlet port and the second outlet port, and the male connector comprises a second pair of annular seals having a third annular seal disposed in the third annular groove and a fourth annular seal disposed in the fourth annular groove.

6. The system of claim 5, wherein the annular exterior surface comprises a first conical surface converging toward the first axial end portion and a second conical surface converging toward the second axial end portion, the first conical surface comprises the first outlet port, the first annular groove, and the second annular groove, and the second conical surface comprises the second outlet port, the third annular groove, and the fourth annular groove.

7. The system of claim 6, comprising a first shaft having a first female receptacle coupled to the male connector along the first conical surface and a second shaft having a second female receptacle coupled to the male connector along the second conical surface.

8. The system of claim 1, wherein an interior of the body is solid except for the passage.

9. The system of claim 1, comprising the first female connector having a first annular wall disposed about a first receptacle, wherein a first portion of the male connector is disposed in the first receptacle, and the first portion comprises the first axial end portion, the first outlet port, and the first pair of annular seals, wherein the first annular wall is configured to elastically expand away from the male connector in response to an application of the first fluid pressure between the first pair of annular seals, and the first annular wall is configured to contract toward the male connector in response to a removal of the first fluid pressure between the first pair of annular seals.

10. A system, comprising:
a male connector, comprising:
a body having a first tapered exterior and a second tapered exterior on opposite axial end portions of the body;
an inlet port into the body axially between the first tapered exterior and the second tapered exterior;
a first outlet port into the body along the first tapered exterior;
a first pair of annular grooves disposed on the first tapered exterior, wherein the first pair of annular grooves comprises first and second annular grooves disposed on opposite axial sides of the first outlet port;
a first pair of annular seals comprising a first annular seal disposed in the first annular groove and a second annular seal disposed in the second annular groove, wherein the first pair of annular seals is configured to generally hold a first fluid pressure from the first outlet port to facilitate insertion or removal of the male connector relative to a first female connector;
a second outlet port into the body along the second tapered exterior;
a second pair of annular grooves disposed on the second tapered exterior, wherein the second pair of annular grooves comprises third and fourth annular grooves disposed on opposite axial sides of the second outlet port;
a second pair of annular seals comprising a third annular seal disposed in the third annular groove and a fourth annular seal disposed in the fourth annular groove, wherein the second pair of annular seals is configured to generally hold a second fluid pressure from the second outlet port to facilitate insertion or removal of the male connector relative to a second female connector; and
a passage extending through the body to the inlet port, the first outlet port, and the second outlet port.

11. The system of claim 10, wherein the first outlet port is configured to selectively apply the first fluid pressure against a first annular wall of the first female connector sealed against the first pair of annular seals to bias the first annular wall radially outward relative to a central axis during the insertion or removal of the male connector relative to the first annular wall, and the second outlet port is configured to selectively apply the second fluid pressure against a second annular wall of the second female connector sealed against the second pair of annular seals to bias the second annular wall radially outward relative to the central axis during the insertion or removal of the male connector relative to the second annular wall.

12. The system of claim 11, comprising a first shaft having the first female connector and a second shaft having the second female connector.

13. The system of claim 10, wherein the first outlet port is configured to apply the first fluid pressure against a first wall of the first female connector sealed against the first pair of seals to bias the first wall radially outward relative to a central axis during insertion or removal of the male connector relative to the first wall, and the second outlet port is configured to apply the second fluid pressure against a second wall of the second female connector sealed against the second pair of seals to bias the second wall radially outward relative to the central axis during insertion or removal of the male connector relative to the second wall.

14. The system of claim 13, comprising a first shaft having the first female connector and a second shaft having the second female connector.

15. A system, comprising:
a male connector, comprising:
a body having a first exterior and a second exterior on opposite axial end portions of the body;
a first outlet port into the body along the first exterior;
a first pair of grooves disposed on the first exterior, wherein the first pair of grooves comprises first and second grooves disposed on opposite axial sides of the first outlet port;
a first pair of seals comprising a first seal disposed in the first groove and a second seal disposed in the second groove, wherein the first pair of seals is configured to generally hold a first fluid pressure to create a first clearance between the male connector and a first female connector, and the first fluid pressure is selectively released to reduce the first clearance between the male connector and the first female connector;
a second outlet port into the body along the second exterior;
a second pair of grooves disposed on the second exterior, wherein the second pair of grooves comprises third and fourth grooves disposed on opposite axial sides of the second outlet port;
a second pair of seals comprising a third seal disposed in the third groove and a fourth seal disposed in the fourth groove, wherein the second pair of seals is configured to generally hold a second fluid pressure to create a second clearance between the male connector and a second female connector, and the second fluid pressure is selectively released to reduce the second clearance between the male connector and the second female connector;

an inlet port into the body axially between the first outlet port and the second outlet port, and a passage extending through the body to the inlet port, the first outlet port, and the second outlet port.

16. The system of claim 15, wherein the first and second exteriors comprises annular surfaces, the first and second pair of grooves comprises annular grooves, and the first and second pair of seals comprises annular seals.

17. A system, comprising:
a first female connector; and
a male connector, comprising:
   a body having a central axis, a first axial end, a second axial end opposite from the first axial end, and an outer surface axially between the first and second axial ends;
   an inlet port into the body through the outer surface crosswise to the central axis;
   a first outlet port out of the body through the outer surface crosswise to the central axis;
   a first pair of annular grooves extending around the central axis into the outer surface, wherein the first pair of annular grooves comprises first and second annular grooves disposed on opposite axial sides of the first outlet port;
   a first pair of annular seals comprising a first annular seal disposed in the first annular groove and a second annular seal disposed in the second annular groove; and
   a passage extending through the body between the inlet port and the first outlet port, wherein the inlet port is configured to route a fluid into the body through the passage to the first outlet port, the first outlet port is configured to route the fluid to a first space between the male connector and the first female connector, the fluid is configured to apply a first fluid pressure to bias the first female connector radially outward relative to the male connector to provide a first clearance during insertion or removal of the male connector relative to the first female connector, and the first fluid pressure is selectively released to reduce the first clearance to create a first interference fit between the male connector and the first female connector.

18. The system of claim 17, wherein the first and second seals enclose the first space.

19. The system of claim 17, wherein the passage is closed at the first and second axial ends.

20. The system of claim 17, wherein the first outlet port is disposed along a first tapered exterior of the body adjacent the first axial end.

21. The system of claim 17, comprising a second outlet port out of the body through the outer surface crosswise to the central axis, wherein the inlet port is disposed axially between the first and second outlet ports.

22. The system of claim 21, comprising:
a second pair of annular grooves extending around the central axis into the outer surface, wherein the second pair of annular grooves comprises third and fourth annular grooves disposed on opposite axial sides of the second outlet port; and
a second pair of annular seals comprising a third annular seal disposed in the third annular groove and a fourth annular seal disposed in the fourth annular grooves.

23. The system of claim 22, wherein the inlet port is configured to route the fluid into the body through the passage to the first and second outlet ports, the second outlet port is configured to route the fluid to a second space between the male connector and a second female connector, the fluid is configured to apply a fluid pressure to bias the second female connector radially outward relative to the male connector to provide a second clearance during insertion or removal of the male connector relative to the second female connector, the second fluid pressure is selectively released to reduce the second clearance to create a second interference fit between the male connector and the second female connector, the first space is enclosed by at least one first seal, and the second space is enclosed by at least one second seal.

* * * * *